Figure 1:
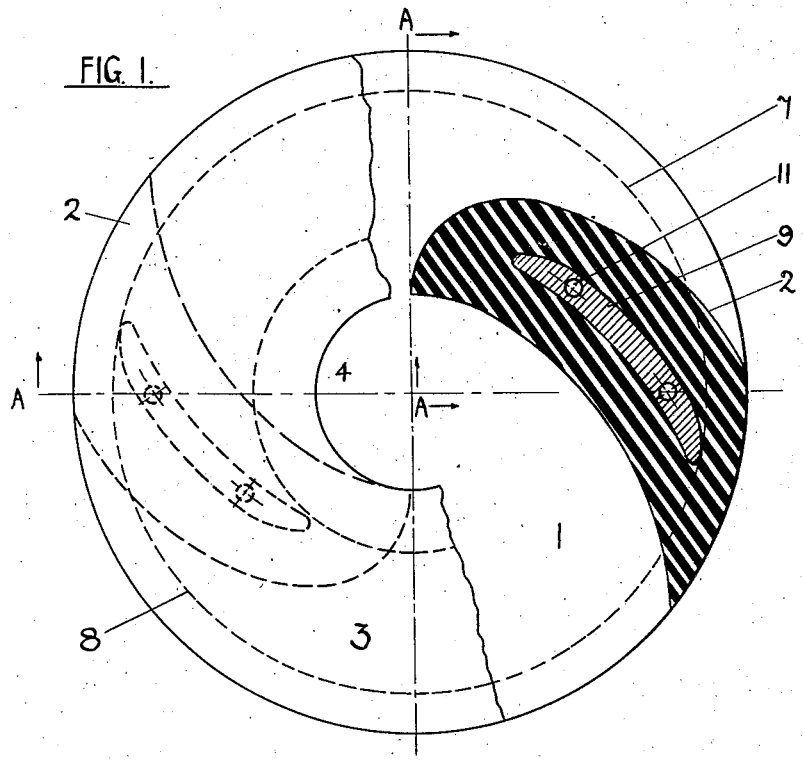

June 14, 1938. G. A. H. GRIERSON 2,120,277
RUBBER COVERED IMPELLER
Filed Sept. 26, 1935

GEORGE A. H. GRIERSON
INVENTOR.
BY Alex E. MacRae
ATTORNEY.

Patented June 14, 1938

2,120,277

UNITED STATES PATENT OFFICE 2,120,277

RUBBER COVERED IMPELLER

George A. H. Grierson, Toronto, Ontario, Canada, assignor to Canadian Allis-Chalmers, Limited, Toronto, Ontario, Canada, a company of Canada Application September 26, 1935, Serial No. 42,258
In Canada April 26, 1935

3 Claims. (Cl. 103—114)

My invention relates to impellers for centrifugal pumps, and more particularly to closed type impellers which are provided with a coating of rubber and which are useful in centrifugal pumps handling fluids containing abrasives or acids.

It is well known that the useful life of the casing of a centrifugal pump handling abrasive or corrosive fluids may be considerably extended by coating the inner surfaces of the casing with a lining of rubber or similar resilient material and it has further been demonstrated that the advantages derived from the rubber lined casing may be enhanced by further providing a rubber lining or coating for the pump impeller. With open type impellers the provision of a suitable rubber coating has been a relatively simple undertaking but in the case of closed type impellers the provision of a satisfactory rubber coating for the active surfaces thereof has been more difficult of attainment, and, so far as I am aware, no impeller of the closed type completely enclosed in a rubber covering has heretofore been presented.

It is an object of my invention to provide for use in a centrifugal pump, a closed type impeller the metal parts of which are completely enclosed in an acid proof and abrasive resistant rubber coating. It is further an object of my invention to provide a rubber covered closed type impeller of unitary construction whereby the separate parts of the impeller are held together to form a unit without the employment of securing screws or bolts.

In accordance with my invention I first construct a metal skeleton comprising a disk and a ring, the disk having suitably placed spacing and blade reinforcing members secured thereto, and the ring having studs secured thereto and adapted to cooperate with the spacing members to accurately locate the ring with respect to the disk. A hub member is also secured to the rear face of the metal disk. The metal skeleton is then accurately balanced, cleaned and plated. A rubber composition in uncured sheet form is then tailored on each face of the disk and ring and about the spacing members, locating pins, and hub, after which the impeller is placed in a mold and subjected to heat and pressure whereby the rubber becomes cured and bonded to the metal skeleton. When the impeller emerges from the mold it is in the form of a unit having a complete unitary coating of rubber and having no mechanical means such as screws or bolts securing the ring to the disk.

A more complete understanding of my invention may be obtained from the following detailed description thereof and the accompanying drawing, and the features of novelty contained therein are pointed out with particularity in the claims appended thereto.

Figure 2:
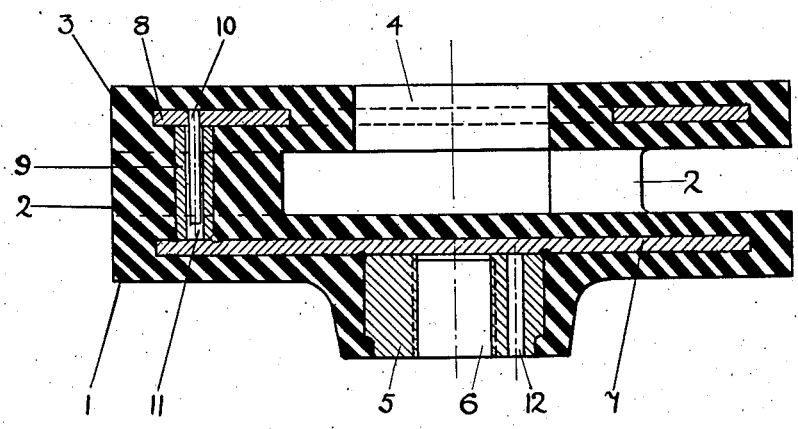

In the drawing, Fig. 1 is a front view from the suction side of a two blade impeller constructed in accordance with my invention, partly in section, and Fig. 2 is a section of the impeller on line A—A of Fig. 1.

As shown in the drawing, the impeller of my invention is of unitary construction, that is in its final form it is formed entirely in one piece, and comprises a plate 1, blades 2 and shroud 3 made up of a body of rubber molded about and bonded to a metal skeleton. The blades 2 are located between said plate and shroud and the shroud is provided with a central substantially circular inlet or suction opening 4 therethrough. It will be understood that the impeller when assembled in a centrifugal pump will be mounted on the end of the pump shaft, and to this end there is provided on the rear face of the plate 1 a hub member 5 having a central tapped aperture 6 therein adapted to engage a suitable screw thread on the end of a pump shaft.

The metal skeleton comprises a disk 7 and ring 8 spaced apart by means of the spacer plates 9. Spacer plates 9 are secured in any suitable manner, as by welding, to the disk 7, and are dimensioned to space the ring 8 the proper distance from the disk 7. Further, the spacers 9 are so placed as to serve as reinforcing members for the rubber forming the blades 2 as shown in Fig. 1. The ring 8 is provided with locating pins 10 secured thereto and arranged to cooperate with suitable holes 11 drilled in the spacer plates 9. The disk 7 has also secured to its rear face the hub member 5 having a central tapped aperture 6 and an offset aperture 12, the purpose of which will become apparent below.

When the metal skeleton has been prepared as above outlined it is first carefully balanced in rotation to eliminate unbalanced weights, and is then cleaned and passed through an electrolytic bath to provide thereon a suitable brass plating. The purpose of the brass plating is to assure a strong bond between the metal of the skeleton and the rubber composition which is subsequently molded thereon. In order to attain this a careful selection is required of the composition of the brass plating in accordance with the rubber composition subsequently used. An uncured rubber composition in sheet form is then tailored about the ring and the disk members of the metal skeleton—taken separately. Sheets of uncured rubber composition are applied to each side of the disk member and a quantity of the uncured rubber composition is also built up about the hub and the spacer members secured thereto. Other sheets of rubber composition are applied to the faces of the ring member of the metal skeleton, suitable apertures being cut therein to permit the metal of the spacer members 9 to abut the metal of the ring member 8 when these members are subsequently placed in the mold. Uncured rubber composition is also tailored about the inner and outer edges of ring member 8 and the outer edges of disk member 7. Care must be taken in this tailoring process to apply sufficient uncured rubber at all parts of the metal skeleton to assure that during the subsequent molding operation an overflow of rubber will be obtained, thus positively filling all parts of the mold.

When the tailoring process is complete, the coated disk member 7 is inserted in a suitable mold, being located therein by means of a suitable locating pin in the mold which is received in the offset aperture 12. It will be understood that a plug is inserted in the tapped central hub aperture 6 in order to prevent rubber from entering the same during the molding operation. Suitable mold plates are inserted in the mold above the plate member and are properly located by locating pins formed in the mold and engaging therewith. The coated ring member 8 is placed in the mold and located therein by the pins 10 which engage in the drilled holes 11 in spacer members 9 secured to the disk 7. A mold cover is then placed over the ring member and the mold is subjected to heat and pressure for a time and to a degree determined by the quantity and composition of the material to be cured. During the curing period the rubber composition is forced to completely fill the mold about the metal skeleton, and suitable overflow openings are provided in the mold in order that any excess rubber composition may escape. At the expiry of the required curing time, the impeller is removed from the mold, the mold plates withdrawn from between the shroud 3 and the plate 1, and the impeller is quickly cooled to prevent overcuring of the rubber composition.

In designing a closed type impeller to be constructed in accordance with my invention, care must be taken to so design the shape of the impeller blades that the mold plates may be removed from the impeller when it comes from the mold. As shown in Fig. 1 of the drawing attached hereto, the trailing side of the blade has been so designed to afford a large taper in the required mold plate with the result that the mold plates are readily removed from the finished impeller. Without this or a similar design difficulty would be experienced in removing these mold plates.

The finished impeller in accordance with my invention comprises a metal skeleton completely enclosed in, and the separate parts thereof are entirely secured together by, a heavy coating of cured rubber firmly bonded to all of the metal parts. Not only does the heavy rubber coating protect all metal parts from wear by the abrasive or corrosive materials being handled, but the firm bond of the rubber to the metal assures that the parts of the impeller will maintain the desired relation one to the other throughout a long useful life, without any possibility of the loosening of any securing means. Furthermore, it will be observed that the blades of the impeller of my invention are constructed almost entirely of rubber composition, thus assuring that these parts, which are subjected to the heaviest wear in use, will be capable of long continued use.

While in accordance with the patent statutes I have described a specific embodiment of my invention it will be apparent to those skilled in the art that many modifications may be made therein. For example, while I have illustrated an impeller provided with only two blades and have illustrated a particular blade curvature, it will be readily apparent that more than two blades may be employed and that the curvature thereof may be widely varied. Consequently, I do not wish to be limited to the particular embodiment shown and described, but aim in the appended claims to cover all such variations and modifications as fall within the true spirit and scope of my invention.

What I claim as new and desire to secure by Letters Patent of the United States, is:

1. A closed type impeller for a centrifugal pump comprising a metal skeleton formed of a metal disk, a separate metal ring, metal spacer members therebetween and means for securing said metal ring to said metal disk in spaced relation thereto, said means comprising solely a body of rubber molded about said skeleton and bonded to the metal parts thereof.

2. A closed type impeller for a centrifugal pump formed of a metal skeleton comprising a disk, spacer members secured to said disk, a separate ring, locating pins secured to said ring and adapted to cooperate with holes in said spacer members to locate said ring with respect to said disk, and a body of rubber molded about and bonded to said metal skeleton whereby said metal skeleton is completely encased in rubber and said ring is secured in spaced relation to said disk solely by said rubber body.

3. A closed type impeller for a centrifugal pump formed of a metal skeleton comprising a disk, spacer members secured to said disk, a separate ring, locating pins secured to said ring and adapted to cooperate with holes in said spacer members to locate said ring with respect to said disk, and a body of rubber molded about and bonded to said metal skeleton whereby said metal skeleton is completely encased in rubber and said ring is secured in spaced relation to said disk solely by said rubber body said rubber body forming impeller blades about said spacer members between said ring and said disk.

GEORGE A. H. GRIERSON.